United States Patent Office 3,468,931
Patented Sept. 23, 1969

3,468,931
4'-SUBSTITUTED DERIVATIVES OF 1,18-DI[2',3',6'-TRIMETHYLPHENYL-(1')]-3,7,12,16-TETRAMETH-YL-1,3,5,7,9,11,13,15,17-OCTADECANONAENE
Giovanni Franceschi and Federico Arcamone, Milan, Italy, assignors to Societa Farmaceutici Italia, Milan, Italy, a corporation of Italy
No Drawing. Filed Oct. 3, 1966, Ser. No. 583,949
Claims priority, application Italy, Oct. 7, 1965, 22,302/65; Feb. 9, 1966, 2,851/66
Int. Cl. C07c 37/20, 69/24; A23k 1/16
U.S. Cl. 260—479
5 Claims

ABSTRACT OF THE DISCLOSURE

The invention relates to 4'-substituted derivatives of 1,18-di[2',3',6'-trimethylphenyl - (1')] - 3,7,12,16 - tetramethyl-1,3,5,7,9,11,13,15,17-octadecanonaene of the following structure:

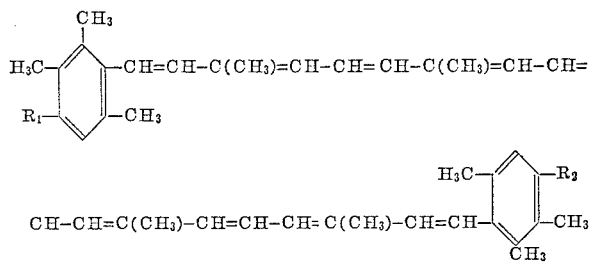

wherein $R_1$ is selected from the group consisting of hydroxy- and acyloxy-group; $R_2$ is selected from the group consisting of hydrogen, hydroxy and acyloxy-group, the acyl of said acyloxy being selected from saturated aliphatic acid of from 1 to 6 carbon atoms; and the process for the preparation thereof. The compounds of the invention are carotenoids, and are characterized by a strong pigmenting power as to make them useful in animal husbandry.

The present invention relates to new carotenoids having pigmenting action and to the process for their preparation. More particularly, the present invention has as an object the 4'-substituted derivatives of 1,18-di[2',3',6'-trimethylphenyl-(1')]-3,7,12,16 - tetramethyl - 1,3,5,7,9, 11,13,15,17-octadecanonaene of the following structure:

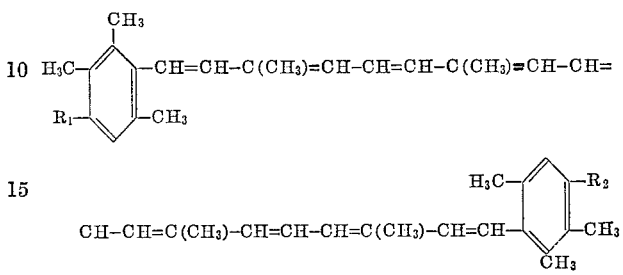

(I)

wherein:

$R_1$ is selected from the group consisting of hydroxy- and acyloxy-group;
$R_2$ is selected from the group consisting of hydrogen, hydroxy and acyloxy-group,
the acyl of said acyloxy being selected from saturated aliphatic acid of from 1 to 6 carbon atoms and an aromatic acid of not more than 9 carbon atoms;
and the process for the preparation thereof.

The new compounds of the invention, belonging to the class of carotenoids, are characterized by a strong pigmenting power as to make them useful in animal husbandry. The process for the preparation of the products of the invention consists in reacting crocetindialdehyde (II) with a Wittig reagent of the group of substituted triphenyl-benzyl-phosphonium halides (IIIa and IIIb) according to the scheme:

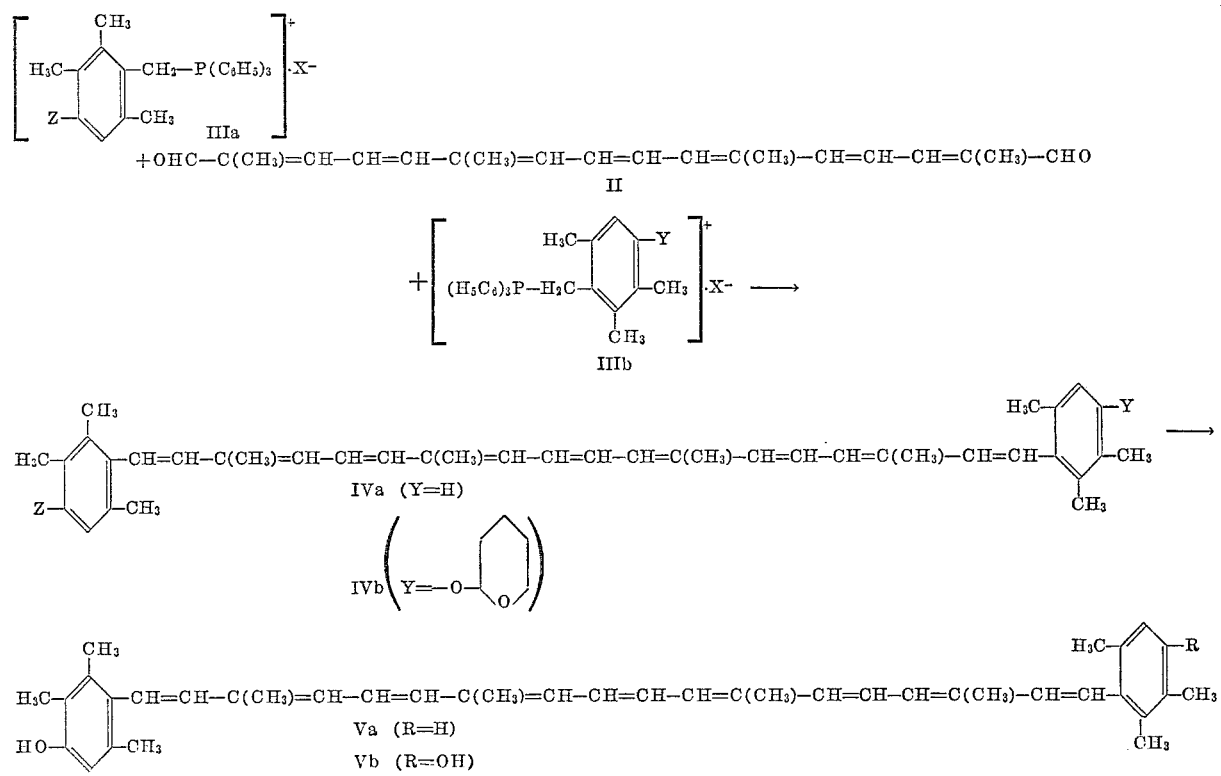

wherein X⁻ is selected from the group consisting of Br⁻ or Cl⁻ ions; Z is

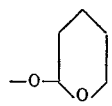

Y is selected from the group consisting of H(IVa) and

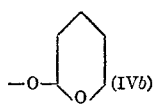 (IVb)

and R is selected from the group consisting of H and OH.

The compound V thus obtained may be transformed into the corresponding esters of a saturated aliphatic acid having from 1 to 6 carbon atoms or of an aromatic acid having not more than 9 carbon atoms. More particularly, the crocetindialdehyde (II), starting product for the process of the invention and known in the literature (Isler et al., Helv. Chim. Acta 58, 1956, p. 463), is dissolved in a suitable organic solvent such as ethyl ether, methanol, ethanol, methylene chloride or dimethylformamide, and is reacted with an equimolecular mixture of the above substituted triphenylbenzyl-phosphonium halides (IIIa) and (IIIb).

The Wittig reagents, employed in the process of the invention, are prepared from the corresponding substituted benzyl alcohol, according to the known techniques (Trippet S., Adv. in Org. Chem. 1, 1960, p. 83). For example, triphenyl-[2,3,6-trimethyl-4-(tetrahydro-2′-pyranyloxy)]-benzylphosphonium halide (IIIa) may be prepared by reaction of 2,3,6-trimethyl-4-hydroxybenzaldehyde with 2,3-dihydro-pyrane and reduction with lithium aluminum hydride to obtain the 2,3,6,-trimethyl-4-(tethahydro-2′-pyranyloxy)-benzyl alcohol, which is then halogenated with phosphorus halide and afterwards condensed with triphenyl phosphine.

The reaction between the crocetindialdehyde and the Wittig reagents is carried out in the presence of a basic compound such as propyllithium, butyllithium, phenyllithium, sodium methylate or sodium ethylate. It is carried out at a temperature of from 20 to 40° C. over a period of from 1 to 24 hours. The reaction may be completed in the cold, for example at 0° C., for 10–15 hours. The reaction is carried out under an atmosphere of an inert gas such as for example nitrogen, and preferably in the absence of light. The pressure is atmospheric, although higher or lower pressures may be used.

The products (IVa) or (IVb) respectively, thus obtained, are transformed into the corresponding product (Va) or (Vb) by acid hydrolysis, which is preferably carried out in the warm. At the end of the reaction, the product obtained is separated by evaporation of the solvent followed by the known techniques of extraction with suitable solvents and separation.

From the above products (Va) and (Vb) thus obtained, the corresponding esters of saturated aliphatic acids having from 1 to 12 carbon atoms or of aromatic acids having not more than 9 carbon atoms may be prepared by acylation with the anhydride or the chloride of the desired acid in the presence of a tertiary amine such as pyridine, trimethylamine or diethylaniline.

The compounds of the present invention are usefully employed in animal husbandry. For instance, when administered to poultry, they show to possess a remarkable pigmenting action. The products of the invention in the form of crystalline powder or liquid, such as solution or suspension, are mixed to the compositions commonly used in feeding animals. Such compositions normally include quantities of carbohydrates, proteins, vitamins and mineral salts. Examples of said substances are wheat and other cereals; residues of meat and fish as a source of animal proteins; soya-bean as a source of vegetable proteins; vitamin complexes containing principally vitamin D, vitamin PP and vitamin $B_{12}$; mineral salts such as calcium carbonate, phosphates and bone-meal. To obtain a uniform dispersion of the products in the feed, the product is preferably thoroughly mixed with an ingredient of the feed commonly used, such as calcium carbonate and bone-meal. Any mixer may be used for this purpose. The mixture obtained is added to the other feed ingredients.

In order to test the pigmenting action of the products of the invention, one determines the total carotenoid content in the yolk and the intensity of pigmentation as measured according to the colorimetric scale "Roche" (see Mainguy P. et al. "La couleur-vitelline" Ed. Hoffman La Roche). The trial has been carried out on 7 months old laying-hens belonging to the strain Kimber 137, divided in groups of 10 animals, each animal being in a single cage. To point out the pigmenting action of the products of the invention, the basic diet employed contained neither yellow maize nor dehydrated lucerne meal, but rather white maize and hay as substituted therefor.

The basic diet has the following composition (the figures being percentages by weight):

| | |
|---|---|
| White maize | 37.1 |
| Oat | 16.9 |
| Wheat bran | 10.0 |
| 44% soya bean meal | 15 |
| Meat meal | 3 |
| Fish meal | 3 |
| Hay | 5 |
| Viol (registered trademark) | 1 |
| dl-Methionine | 0.1 |
| Bicalcium phosphate | 2 |
| Calcium carbonate | 5.5 |
| Sodium chloride | 0.4 |
| Mixture of vitamins and oligoelements | 1.0 |

The mixture of vitamins and oligoelements has the following composition (the values refer to 1 kg. of mixture):

| | |
|---|---|
| Protected vitamin A (I.U.) | 1,000,000 |
| Protected vitamin $D_3$ (I.U.) | 100,000 |
| Protected vitamin E (I.U.) | 250 |
| Vitamin $B_2$ g | 0.5 |
| Vitamin $B_{12}$ g | 0.001 |
| Vitamin $K_3$ g | 0.15 |
| Vitamin PP g | 2.00 |
| d-Calciumpanthothenate g | 1.50 |
| dl-Methionine g | 20.00 |
| Coline chloride g | 100.00 |
| Chlorotethracycline hydrochloride g | 1.00 |
| Penicillin G procaine g | 0.50 |
| Cobalt g | 0.025 |
| Iron g | 1.5 |
| Iodine g | 0.1 |
| Manganese g | 7 |
| Zinc g | 4 |
| Hydroxybutyltoluene | 5 |
| Viol (registered trademark) g | 100 |
| Vehicle q.s. to 1000. | |

The chickens under examination have been fed "ad libitum" during all the experiment. The group which forms the controls has been fed with the above diet while the other groups for the first 20 days with the above diet and for the following 22 days with the same diet to which 670 mg./quintal of 1-[2′,3′,6′ - trimethyl-4′-hydroxyphenyl-(1′)] - 18 - [2′,3′,6′ - trimethylphenyl-(1′)]-3,7,12,16-tetramethyl - 1,3,5,7,9,11,13,15,17 - octadecanonaene had been added.

Table 1 reports the average amount of total carotenoids in the yolk of each group determined on alternate days and the intensity of pigmentation during the first 20 days (pre-experimental period) and the following 22 days (experimental period).

TABLE 1

| | Pre-experimental period | | Experimental period | |
|---|---|---|---|---|
| | Total carotenoids, mg./kg. | Scale "Roche" | Total carotenoids, mg./kg. | Scale "Roche" |
| Controls | 16.37 | 3.8 | 5.17 | 3.0 |
| Treated animals | 14.97 | 3.4 | 9.04 | 5.7 |

The following examples serve to illustrate, but not limit, the present invention:

Example 1.—1,18-di-[2',3',6'-trimethyl-4'-hydroxyphenyl-(1')] - 3,7,12,16-tetramethyl-1,3,5,7,9,11,13,15,17-octadecanonaene 14.6 g. of 2,3,6-trimethyl-4-hydroxybenzaldehyde [J. S. Fitzgerald, J. Appl. Chem. 1955, 5, page 289], suspended in 400 cc. of chloroform, are mixed with 40 cc. of 2,3-dihydropyrane and 2 cc. of concentrated hydrochloric acid at 0° C. The mixture is stirred for 3 hours at room temperature. The reaction mixture is washed with water to neutrality and concentrated in vacuo.

The crude oily residue thus obtained, dissolved in 50 cc. of anhydrous diethyl ether, is added to a suspension of 2 g. lithium aluminum hydride in 200 cc. of anhydrous diethyl ether cooled to 0° C. The mixture is stirred for 7 hours at room temperature. The lithium aluminium hydride excess is decomposed with ammonium chloride and by evaporating off the solvent a residue is obtained. The residue when recrystallized from petroleum ether yields 11.2 g. of 2,3,6-trimethyl-4-(tetrahydro-2'-pyranyloxy)-benzyl alcohol, melting at 85° C.

To 5 g. of this alcohol, dissolved in a mixture of 125 cc. of petroleum ether and 200 cc. of carbon tetrachloride, are added 10 g. of potassium carbonate and a solution of 0.7 cc. of phosphorus tribromide in 50 cc. of petroleum ether with stirring at −30° C. The reaction mixture is slowly warmed up to 150° C. during 1 hour and washed with ice water. The organic phase is concentrated in vacuo. The oily residue is dissolved in 5 cc. of anhydrous benzene and added at room temperature and under stirring, to a solution of 10 g. of triphenylphosphine in 50 cc. of anhydrous benzene. This mixture is kept overnight at room temperature. A sticky precipitate is obtained which, after decanting the supernatant liquid, is washed several times with anhydrous benzene. By drying at 78° C. in vacuo 6.4 g. of triphenyl-[2,3,6-trimethyl-4-(tetrahydro-2'-pyranyloxy)]-benzyl-phosphonium bromide, melting at 264–265° C. (with decomposition), are obtained.

0.305 g. of such compound finely powdered and suspended in 5 cc. of anhydrous diethyl ether are added with stirring to a small excess of n.-butyllithium solution in diethyl ether (also called ethyl ether). The mixture is stirred for 20 minutes at room temperature, then to the red solution obtained are added 50 mg. of crocetindialdehyde dissolved in 2.5 cc. of methylene dichloride during 5 minutes. The mixture is kept at 40° C. under nitrogen for 3 hours. Afterwards 4 cc. of methanol are added and kept at 0° C. for 12 hours. 100 mg. of a dark red product consisting of 1,18-di[2',3',6'-trimethyl-4'-tetrahydropyranyloxy-phenyl-(1')]-3,7,12,16-tetramethyl - 1,3,5,7,9, 11,13,15,17-octadecanonaene are separated which on recrystallization from benzene-methanol melts at 185° C.–187° C.

50 mg. of this compound are dissolved in a mixture of 10 cc. of methylene dichloride-diethyl ether (1:1) and mixed with a solution of 25 mg. of p-toluene-sulphonic acid in 1 cc. of 96% ethanol. The mixture is then warmed up to 45° C. for 1 hour under nitrogen. The organic phase is washed with water and evaporated. The residue is chromatographed over a silicic acid column and eluted with benzene containing 10% of acetone. 35 mg. of a dark red product consisting of 1,18-di-[2',3',6',-trimethyl-4'-hydroxyphenyl - (1')[-3,7,12,16-tetramethyl - 1,3,5,7,9,11, 13,15,17-octadecanonaene, melting at 200° C. (with decomposition) is obtained; absorption maxima at 425, 449 and 476 mµ; $R_f$=0.26 (methylene dichloride).

Example 2.—1,18-di[2',3',6'-trimethyl-4'-acetoxyphenyl-(1')] - 3,7,12,16 - tetramethyl-1,3,5,7,9,11,13,15,17-octadecanonaene 55 mg. of 1,18-di [2',3',6'-trimethyl-4'-hydroxyphenyl-(1')] - 3,7,12,16 - tetramethyl-1,3,5,7,9,11,13,15,17-octadecanonaene prepared as described in Example 1 are dissolved in a mixture of 1.3 cc. of pyridine and 2.5 cc. of acetic anhydride. The solution obtained is kept at room temperature and in the absence of light for 1 hour, then it is poured into ice. After decomposition of the anhydride, the precipitate is collected, washed with water and recrystallized from acetone to give rhombic crystals, melting at 182–184° C., of 1,18-di[2',3',6'-trimethyl-4'-acetoxyphenyl-(1')-]3,7,12,16-tetramethyl - 1,3,5,7,9,11,13,15,17-octadecanonaene. Absorption maxima at 425, 449, 475 mµ (in petroleum ether). On thin layers of silica gel, it shows $R_f$=0.35 (benzene).

Example 3. — 1 - [2',3',6',-trimethyl - 4'-hydroxyphenyl-(1')]-3,7,12,16-tetramethyl-1,3,5,7,9,11,13,15,17-octadecanonaene 9.3 g. of triphenyl-[2,3,6-trimethyl-4-(tetrahydro-2'-pyranyloxy)]-benzylphosphonium bromide and 4.1 g. of triphenyl-(2,3,6-trimethyl)-benzyl-phosphonium bromide, finely powdered, are suspended in 260 cc. of anhydrous diethyl ether, and mixed with a small excess of an n-butyllithium solution in ethyl ether with stirring and in a nitrogen atmosphere. The mixture is kept for 20 minutes at room temperature. Then 2.58 g. of crocetindialdehyde dissolved in 90 cc. of methylene dichloride are added over 15 minutes to the red solution obtained. The mixture is kept at 40° C. for one and a half hours with stirring and under a nitrogen atmosphere. 200 cc. of methanol are then added. The solution is concentrated to about a quarter of its volume and kept at 0° C. for 12 hours. 5.3 g. of a product thus obtained are dissolved in 1000 cc. of methylene dichloride/ethyl ether mixture (1:1) and mixed with a solution of 2.4 g. of p-toluenesulphonic acid in 100 cc. of 96% ethanol. The reaction mixture is kept at 45° C. for 1 hour under a nitrogen atmosphere. The organic phase is washed with water and evaporated to dryness. The residue is chromatographed over a silicic acid column and eluted with benzene. Three red bands are obtained. From the central band, 1.5 g. of 1-[2', 3', 6'-trimethyl-4'-hydroxyphenyl-(1')]-18-[2',3',6'-trimethyl-phenyl-(1')]-3,7,12,16-tetramethyl-1,3,5,7,9,11, 13,15,17-octadecanonaene are recovered, melting at 180° C.–184° C.; absorption maxima at 420, 445 and 470 mµ (petroleum ether); $R_f$=0.83 (methylene dichloride).

Example 4.—1-[2'3',6'-trimethyl-4'acetoxyphenyl-(1')]-18-[2',3',6'-trimethyl-phenyl - (1')] - 3,7,12,16 - tetramethyl-1,3,5,7,9,11,13,15-octadecanonaene A solution of 100 mg. of 1-[2',3',6',-trimethyl-4'-hydroxyphenyl-(1')]-18-[2',3',6' - trimethylphenyl - (1')]-3,7,12,16-tetramethyl-1,3,5,7,9,11,13,15,17 - octadecanonaene, obtained as in Example 3, in a mixture of 2 cc. of pyridine and 2 cc. of acetic anhydride is kept for one and a half hours at room temperature and in the absence of light. The mixture is then poured into ice. After decomposition of the acetic anhydride, the precipitate is collected, chromatographed over a silica gel column and eluted with petroleum ether containing 3% of acetone. By recrystallization from petroleum ether, 40 mg. of crystals of 1-[2',3',6'-trimethyl - 4' - acetoxyphenyl-(1')]-18-[2',3',6'-trimethylphenyl-(1')]-3,7,12,16 - tetramethyl-1,3,5,7,9,11,13,15,17-octadecanonaene, melting at 155–158° C., are obtained; absorption maxima at 425, 445 and 476 mµ (in petroleum ether). On thin layers of silica gel, $R_f$=0.75 (benzene).

We claim:
1. A compound of the formula:

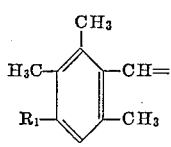—CH=CH—C(CH₃)=CH—CH=CH—C(CH₃)=CH—CH=CH—CH=C(CH₃)—CH=CH—CH=C(CH₃)—CH=CH—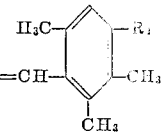

wherein:
R₁ is selected from the group consisting of hydroxy and acyloxy group;
R₂ is selected from the group consisting of hydrogen, hydroxy and acyloxy group,
the acyl of said acyloxy being selected from the alkanoic acids of from 1 to 6 carbon atoms.

2. The compound of claim 1 which is 1,18-di[2',3',6'-trimethyl-4'-hydroxyphenyl-(1')]-3,7,12,16 - tetramethyl-1,3,5,7,9,11,13,15,17-octadecanonaene.

3. The compound of claim 1 which is 1,18-di[2',3',6'-trimethyl - 4' - acetoxyphenyl - (1')] - 3,7,12,16 - tetramethyl-1,3,5,7,9,11,13,15,17 - octadecanonaene.

4. The compound of claim 1 which is 1-[2',3',6'-trimethyl - 4' - hydroxyphenyl - (1')] - 18 - [2',3',6'-trimethyl-phenyl-(1')] - 3,7,12,16 - tetramethyl - 1,3,5,7,9,11,13,15,17-octadecanonaene.

5. The compound of claim 1 which is 1-[2',3',6'-trimethyl - 4' - acetoxyphenyl - (1')] - 18 - [2',3',6' - trimethyl-phenyl - (1') - 3,7,12,16 - tetramethyl - 1,3,5,7,9,11,13,15,17-octadecanonaene.

References Cited

Organic Reactions, ed. by Adams et al., vol. 14, pp. 270–272 (March 1965).

LORRAINE A. WEINBERGER, Primary Examiner

M. G. BERGER, Assistant Examiner

U.S. Cl. X.R.

99—2; 260—345.1, 345.9, 476, 606.5, 619